United States Patent [19]

Reynolds

[11] Patent Number: 4,905,576
[45] Date of Patent: Mar. 6, 1990

[54] PRESSURE CYLINDER

[75] Inventor: Desmond H. J. Reynolds, West Midlands, Great Britain

[73] Assignee: Lucas Industries Public Limited Company, Birmingham, England

[21] Appl. No.: 184,397

[22] Filed: Apr. 21, 1988

[30] Foreign Application Priority Data

Apr. 21, 1987 [GB] United Kingdom ............... 8709421

[51] Int. Cl.⁴ .............................................. F01B 29/00
[52] U.S. Cl. ..................................... 92/128; 92/169.1; 92/161; 403/349; 403/315; 403/348
[58] Field of Search ....................... 92/128, 161, 169.1, 92/146; 60/533; 403/315, 319, 326, 334, 348, 349, 377

[56] References Cited

U.S. PATENT DOCUMENTS

| | | | |
|---|---|---|---|
| 817,672 | 4/1906 | Sansom | 403/349 X |
| 3,156,097 | 11/1964 | Brown | 92/169.1 X |
| 4,783,897 | 11/1988 | Basnett | 92/161 |

FOREIGN PATENT DOCUMENTS

| | | | |
|---|---|---|---|
| 1026134 | 3/1958 | Fed. Rep. of Germany | 403/348 |
| 744184 | 6/1980 | U.S.S.R. | 92/169.1 |
| 1438195 | 6/1976 | United Kingdom | 403/315 |

Primary Examiner—Edward K. Look
Assistant Examiner—Thomas Denion
Attorney, Agent, or Firm—Fleit, Jacobson, Cohn, Price, Holman & Stern

[57] ABSTRACT

A pressure cylinder, such as a master cylinder, primarily for use in a vehicle brake or clutch hydraulic system includes a cylinder component molded from plastics material, and an initially separate flange component which is preferably but not essentially, also molded from plastics material. The two components are provided with an interconnecting arrangement capable of transmitting axial thrust between the two components, and also resisting relative rotation therebetween.

13 Claims, 4 Drawing Sheets

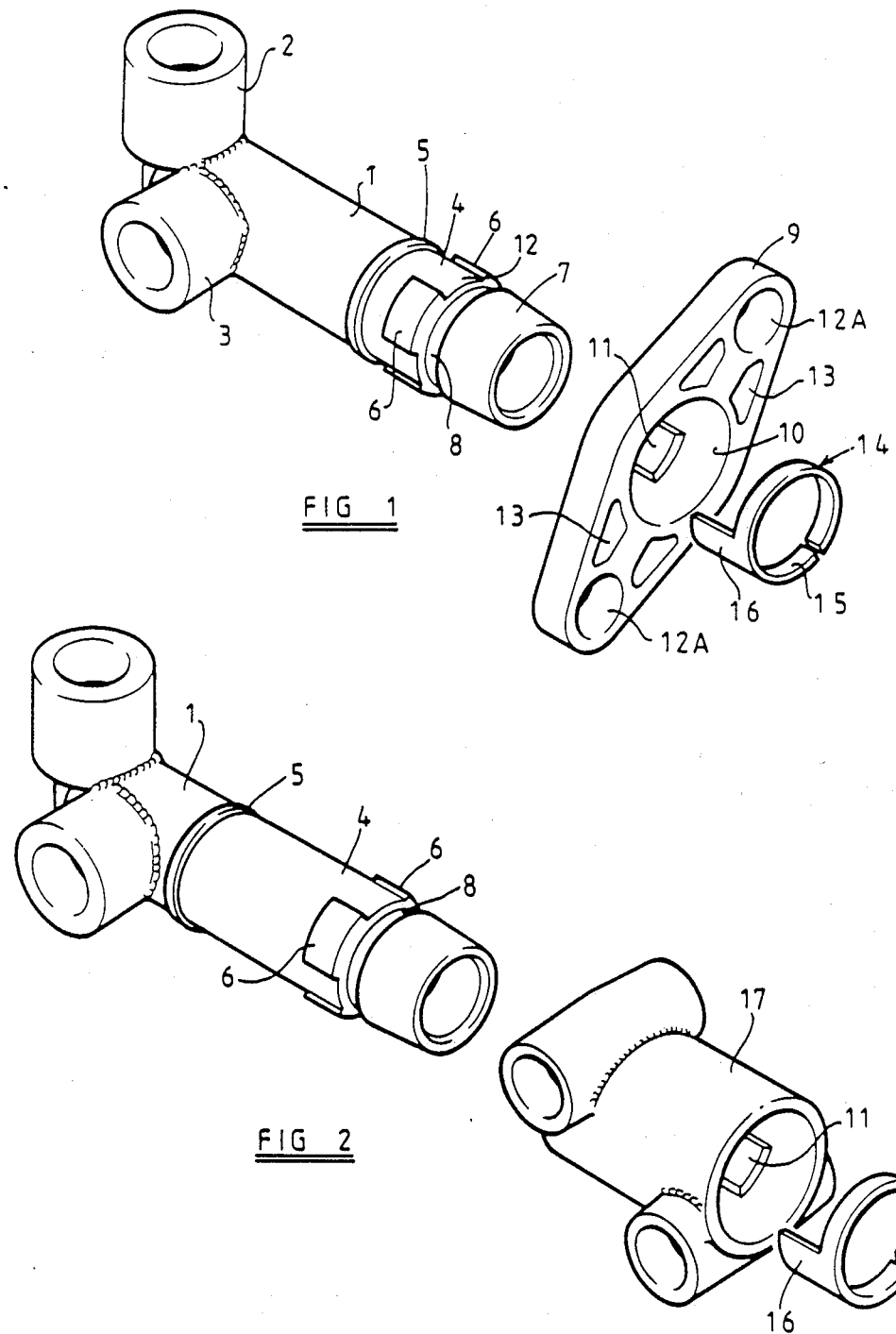

PRESSURE CYLINDER

BACKGROUND OF THE INVENTION

This invention relates to a pressure cylinder such as a master cylinder, primarily for use in a vehicle brake or clutch hydraulic system, and particularly to such a cylinder molded from plastics material and having a surrounding body, such as a mounting flange, serving for the attachment of the assembly to a support.

Proposals have already been made for the production, by molding from plastics material, of a pressure cylinder having an integral surrounding body in the form of a mounting flange. However, because the mounting flange of such a cylinder is usually of significantly greater thickness than the cylinder wall, differential contractions occur upon cooling after molding, which can result in cylinder bore distortion in the region of the flange. Such distortion can create problems in maintaining an adequate seal between the cylinder internal wall and an internal co-operating piston assembly and can also result in the snagging of the piston and/or its associated seals and possible consequent jamming of the piston assembly within the cylinder.

One attempt to solve this problem consists in mounting the flange by way of an outer cylindrical formation generally co-axial with and surrounding the cylinder proper, said formation being connected to the cylinder at a position beyond the inward limit of piston travel. This arrangement removes any bore distortion resulting from the flange molding to a location at which it does not significantly adversely effect the travel or sealing of the piston assembly. However, unless the cylindrical formation carrying the flange is made relatively short, there is a risk of untoward flexing of the formation and consequent movement of the cylinder taking place during operation of the master cylinder, in use. Alternatively, by making the formation as short as possible, an undesirably long portion of the cylinder extends rearwardly of the flange and can be difficult to accommodate. Thus, although this approach can produce a satisfactory practical cylinder, it introduces restrictions upon the cylinder design and associated molding process, as well as requiring extra material, all of which leads to additional manufacturing cost.

BRIEF SUMMARY OF THE INVENTION

An object of the present invention is to provide a pressure cylinder of plastics material in which the aforesaid problems are minimized or avoided.

According to the present invention, a pressure cylinder comprises a cylinder component molded from plastics material and an initially separate body component surrounding the cylinder component, and means interconnecting the components such as to transmit axial thrust between the two components and to resist relative rotation therebetween.

In one convenient arrangement, the components are provided with formations arranged to be interdigitated and, by relative axial movement of the components in one direction, brought to positions in which the formations disengage axially to permit relative rotation of the components to bring the formations substantially into axial alignment so as to resist reverse axial relative movement of the components and thereby sustain axial loads acting between them, and a locking device is arranged to prevent relative rotation of the components.

In an alternative arrangement, each component has at least one formation arranged to be engaged with a complementary formation on the other by axial relative movement of the components through a distance predetermined by abutment means, and thereby prevent relative rotation between the components, and a locking device interconnecting the components in a manner such as to prevent reverse relative axial movement thereof and thereby sustain axial loads acting between the components.

The locking device in both of the aforesaid arrangements is preferably a separate split ring which is engaged in a groove of one of the components and may project radially against a surface of the other component to provide an abutment preventing said reverse axial movement when said formations are such as to prevent only relative rotation. When the locking device acts to prevent relative rotation between the components, it is provided with an axial tongue which lies between aligned pairs of formations of both components.

Alternatively, when the formations themselves act to resist said reverse axial movement of the components, the locking device may conveniently take the form of a flexible arm on one of the components, preferably formed integrally therewith, and a corresponding recess on the other component into which the arm snap-engages when the formations are in their axial load sustaining positions.

The invention will now be described by way of example, with reference to the accompanying drawings wherein:

FIG. 1 is an exploded perspective view of one form of the pressure cylinder of the invention;

FIG. 2 is a view similar to FIG. 1 showing an alternative embodiment;

DETAILED DESCRIPTION

Figure 3:
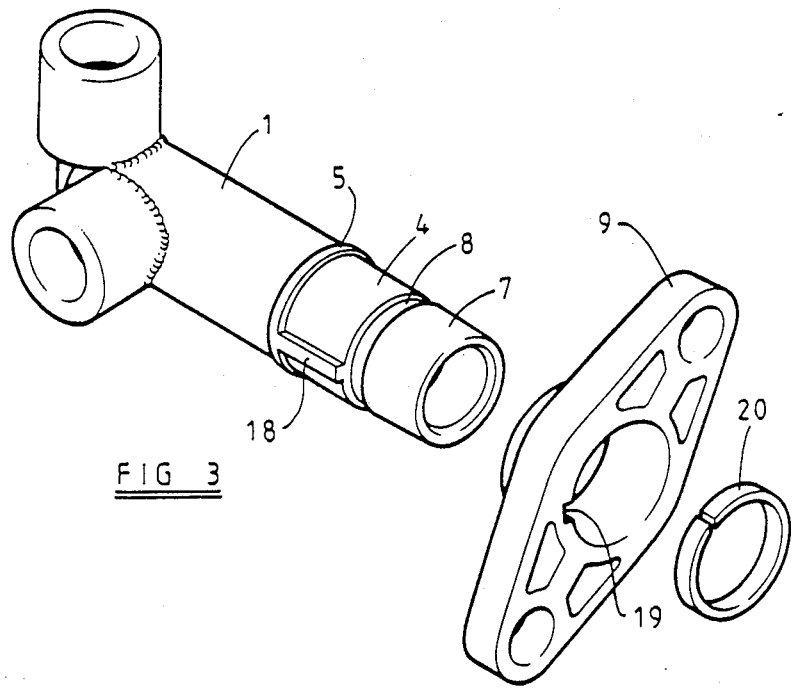
FIG. 3 is a view similar to FIG. 1 showing a further alternative embodiment of the pressure cylinder of the invention.

The pressure cylinder illustrated in FIG. 1 of the drawings includes a cylinder member 1 molded from plastics material and having an inlet port connection 2 for connection thereto of a reservoir (not shown) and an outlet port connection 3 for the connection of the cylinder to a vehicle brake or clutch hydraulic system, for example. An end portion 4 of the cylinder 1 is of slightly reduced diameter, forming an abutment shoulder 5 and is provided with a plurality of spaced castellations 6 which extend axially over approximately half the length of the reduced diameter portion 4. Conveniently said castellations 6 are equi-angularly spaced. The extreme end portion 7 of the cylinder forms a tapered nose spaced from the portion 4 by a peripheral groove 8.

The pressure cylinder also includes a surrounding body component in the form of a mounting flange member 9 which could be formed from a metal alloy but which preferably is molded from plastics material similar to that of the member 1. The flange member has a central opening 10 of similar diameter to the external diameter of the castellations 6 of the cylinder portion 4 and containing at least one and preferably several internal castellations 11 of angular extent matching the gaps 12 between the cylinder castellations 6 and of axial extent similar to the distance between the inner ends of the castellations 6 and shoulder 5 of the cylinder. The flange member 9 is also provided with through holes 12A for the passage of fixing bolts in conventional manner and may have other openings or recesses 13 to minimize the material required for the flange member.

A locking device 14 is provided in the form of a circular split ring 15 of diameter such as to fit closely around the free end portion of the cylinder tapered nose 7. The locking device has an axially projecting tongue 16 having an angular extent such that it fits closely between adjacent cylinder castellations 6 and an axial extent approximately equal to the axial length of the reduced diameter cylinder portion 4.

In order to assemble the flange component on to the cylinder 1, the flange component is passed over the tapered cylinder portion 7 and offered to the cylinder portion 4 with the castellations 11 of the flange component in alignment with the spaces between the cylinder castellations 6. The flange component is then moved on to and along the cylinder portion 4 into engagement with the shoulder 5, at which position the castellations 11 will lie axially beyond the cylinder castellations 6. The flange component may then be moved angularly to bring the castellations 11 behind and into register with the castellations 6 so as to lock the flange component axially on the cylinder 1. The flange component is then locked permanently in position on the cylinder by means of the locking device 14 which is placed on the tapered cylinder nose 7 with the axial tongue 16 aligned with one of the spaces between the cylinder castellations 6. The locking device is then forced along the taper 7 and is thereby caused to expand under resilient deformation until it is moved beyond the nose 7, whereupon it once again contracts and snap-engages in the groove 8.

The axial movement of the locking device along the nose 7 and into the groove 8 moves the tongue 16 through the space, with which the tongue is aligned, between a pair of castellations 6 and corresponding castellations 11, the tongue then bridging between pairs of castellations 6 and 11 and preventing relative angular movement between the flange member and cylinder. It will be seen that, once the locking device 14 has been placed in position as aforesaid, it permanently locks the flange member 9 and cylinder 1 against both axial and angular relative displacement.

FIG. 2 illustrates an alternative arrangement in which the body component is in the form of a cylindrical sleeve or collar 17. The length of the cylindrical portion 4 of the cylinder is increased in this embodiment to accommodate the sleeve, and the internal castellations 11 of the sleeve are arranged so that they may be brought into register behind the corresponding cylinder castellations 6 when the sleeve is brought into engagement with the cylinder shoulder 5 in the manner described in connection with FIG. 1. A locking device 14 similar to that shown in FIG. 1 is again provided and is brought into engagement with the cylinder groove 8 with its tongue 16 lying between adjacent pairs of castellations 6 and 11, in the manner previously described, to lock the cylinder and sleeve permanently against relative angular and axial displacement.

In the alternative embodiment illustrated in FIG. 3, the cylinder 1 again has a portion 4 of reduced diameter forming a shoulder 5 and is also provided with a tapered nose 7 separated from the portion 4 by a groove 8. In this embodiment, however, one or more generally rectangular section keys 18 extend along the entire axial length of the cylinder portion 4 and the flange member 9 is provided with a corresponding number of complementary keyways 19. The flange member 9 is mounted on the portion 4 of the cylinder 1 by registering the or each keyway 19 with its corresponding key 18 and moving the flange member axially into engagement with the shoulder 5. The interengaged keys and keyways then preclude relative angular movement between the flange and cylinder. The flange member is locked permanently on the cylinder by means of a resilient split locking ring 20 which is placed on the taper 7 and expanded by movement along the taper until it reaches the groove 8 into which it snap engages, projecting radially outwardly of the groove by an amount sufficient to prevent axial disengagement of the flange member and cylinder.

Figure 4:
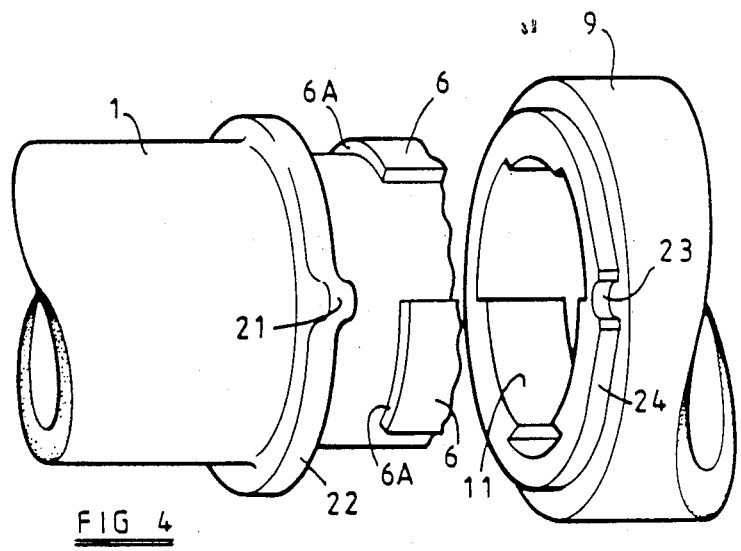
FIG. 4 is a fragmentary perspective view of part of a further alternative embodiment of the invention.

FIG. 4 illustrates a further alternative embodiment similar in principle to that of FIG. 1 and 2, except that the locking device is formed integrally with the cylinder 1 and flange or other component 9 and comprises a radially projecting arm 21 on a radial flange 22 of the cylinder, the arm being curved slightly out of the plane of the flange in the direction towards the component 9. The latter has a corresponding recess or groove 23 and the flange 22 is spaced from the cylinder castellations 6 so that, when the latter are engaged behind the castellations 11 of the component 9 in the manner described previously by relative angular movement between the cylinder and component, the projection 21 performs a camming action against a contoured surface 24 of the component 9 so as to be radially resiliently deformed, subsequently to snap-engage into the recess 23 upon reaching alignment therewith. It is possible to form the rear edge faces 6A as part of a helical formation and to provide a corresponding formation on the inner end surfaces of the castellations 11, such that during angular relative rotation between the components 1 and 9 to bring the castellations 6 and 11 into alignment, a camming action is provided to draw the components together, thereby further enhancing the locking action of the projection 21 and recess 23.

Figure 5:
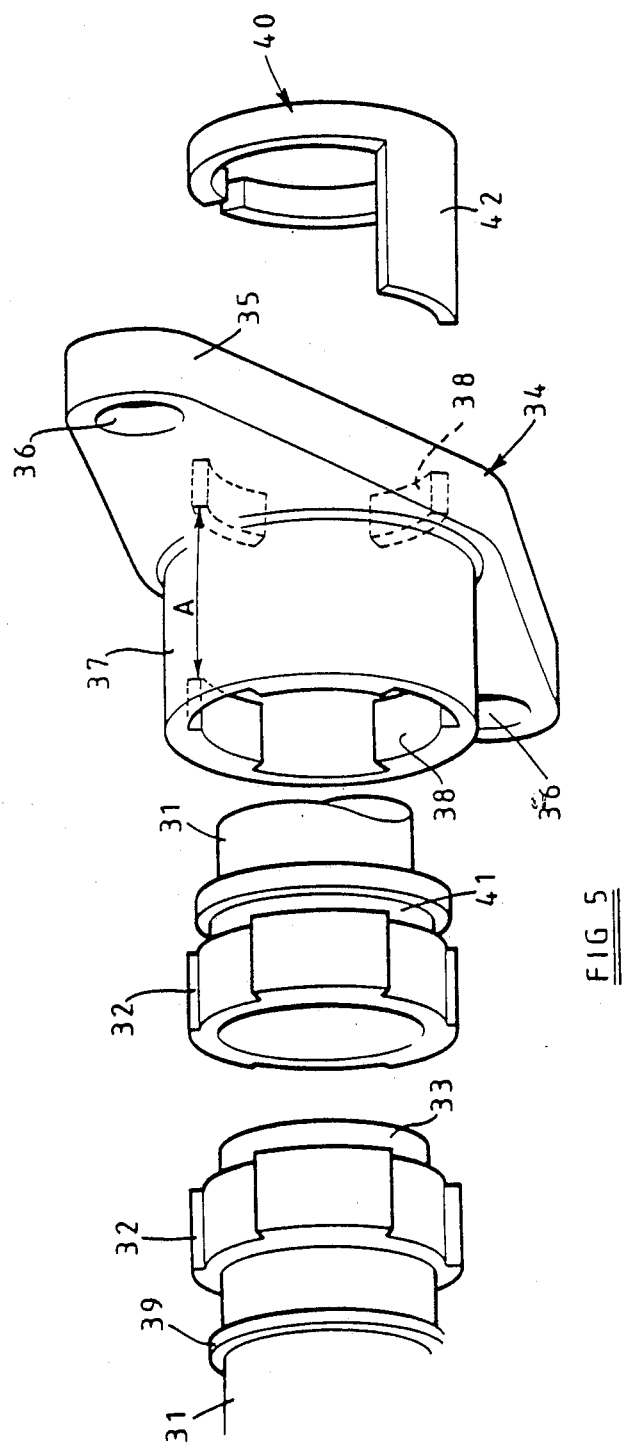
FIG. 5 is a side elevation of a master cylinder embodying the invention in yet another alternative form.

FIG. 5 illustrates the invention applied to a master cylinder formed from two co-axially arranged cylinder portions 31 each having castellations 32 similar to those shown at 6 in FIG. 1, the portions 31 being brought together end to end to form a composite cylinder. Radial location is provided, if required, by insertion of a cylindrical end portion 33 of one cylinder part into the internal bore of the other. The cylinder parts are assembled with respective pairs of castellations 32 in axial alignment so as effectively to form composite castellations, the combined length of which is twice that of a single castellation 32. The flange member 34 includes a flange proper 35 having openings 36 for fixing bolts, in conventional manner. The flange member 34 also has an axially projecting cylindrical part 37 of which the axial length is greater than the combined lengths of the castellations 32 on the respective members 31. The cylindrical part 37 is formed internally with castellations 38 similar to those described previously but arranged in two rows of aligned pairs, spaced by a distance A which is approximately equal to the combined lengths of the castellations 32 on the cylinder portions 31. The cylinder components and flange member are assembled by relative axial movement of the flange member and cylinder portions until the flange member abuts against a shoulder 39 on one of the cylinder portions which is placed so that the pairs of internal castellations 38 lie at either side of the composite castellations 32, whereupon the flange member may be rotated to bring the castellations of the flange member and cylinder portions into alignment to lock the flange member axially relative to the cylinder portions. Final axial locking is provided by a locking device 40 similar to the device 14 of FIG. 1. The locking device is brought into snap-engagement with a groove 41 in one of the cylinder portions with a tongue 42 of the locking device lying in spaces between the internal and external castellations to prevent relative rotation between the engaged components.

Figure 6:
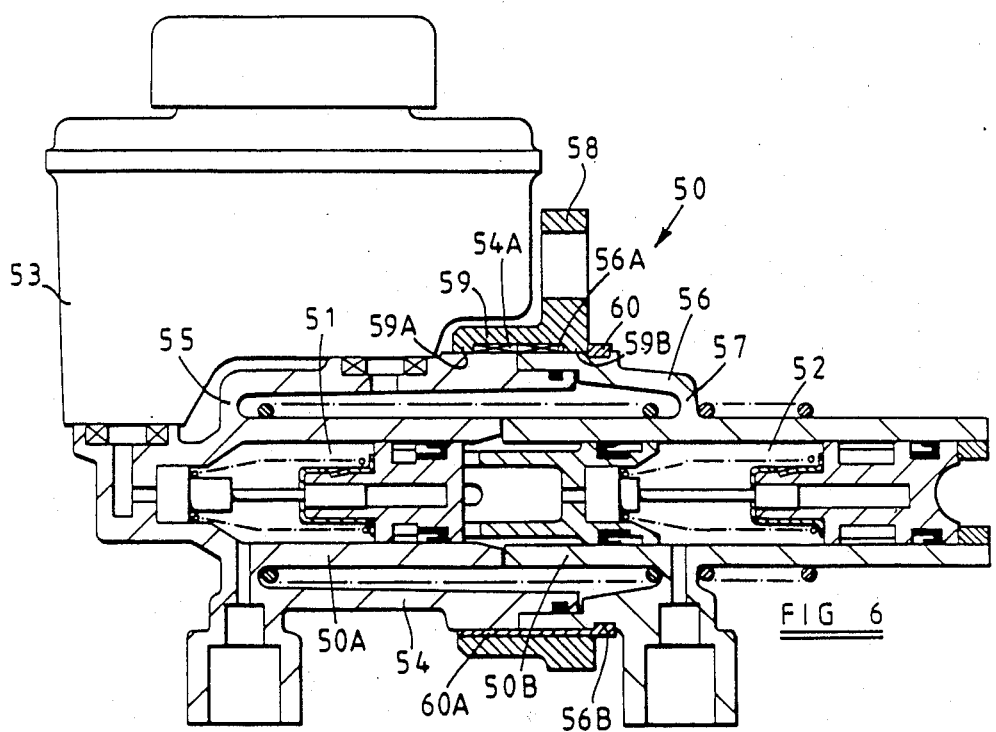
FIG. 6 is an enlarged exploded perspective view of part of the master cylinder of FIG. 5.

In the arrangement illustrated in FIG. 6, a pressure cylinder 50 is composed of two cylinder portions 50A and 50B connected together in axial alignment to form a composite cylinder having respective pressure chambers 51, 52 therein. A reservoir 53 is mounted on the upper side of the assembly and communicates with the pressure chambers via recuperation ports, in conventional manner. The internal components of the cylinders are entirely conventional and are not described in detail. The cylinder portion 50A is surrounded in spaced relationship over part of its length by a cylindrical connector 54 which is joined to the cylinder portion by a radial web 55 disposed beyond the normal limit of inward travel along the cylinder of a seal carried by a working piston. A similar cylindrical connector 56 surrounds the cylinder portion 50B and is connected thereto by a radial web 57. The part 56 carries a radial flange 58 serving to mount the master cylinder on a fixed support structure, such as the bulkhead of a vehicle. The invention concerns the fixing together of the cylinder portions 50A, 50B and this is effected by means similar to that illustrated in FIG. 5 in that the cylindrical connector parts 54, 56 are provided with respective sets of external angularly spaced castellations 54A, 56A and an axially extending cylindrical part 59 of the flange contains spaced pairs of internal castellations 59A, 59B such that the sleeve may be installed over the juxtaposed connectors 54, 56 and rotated to lock these together axially. A locking ring 60 is then inserted in a groove 56B of the connector 56 to prevent axial withdrawal of the flange, a tongue 60A of the locking ring being inserted between adjacent pairs of castellations 54A, 56A to lock the cylinder portions against rotation, as described previously.

I claim:

1. A pressure cylinder comprising:
a cylinder component molded from plastics material;
a separate body component surrounding said cylinder component;
a plurality of first formations on said cylinder component;
a plurality of second formations on said body component;
said first and second formations being shaped and positioned on the respective components with respect to each other during and after assembly of said components so that during assembly said formations are interdigitated during relative axial displacement of said components in one direction to a position wherein relative axial displacement between said components in said one direction is resisted and said formations are relatively rotatable into substantial axial alignment of said first formations with said second formations for resisting relative axial movement of and sustaining axial loads on said components in a reverse direction; and
locking means for locking said components when assembled against disassembly comprising an axially extending tongue removably insertable between adjacent pairs of aligned first and second formations and means integral with said tongue cooperating with a further formation on one of said components for positively locking said tongue in place.

2. A pressure cylinder as claimed in claim 1 wherein:
said locking means prevents relative rotation between said components.

3. The pressure cylinder as claimed in claim 1 and further comprising:
a reduced diameter portion on said cylinder component, said first formations extending radially outwardly from said reduced diameter portion in circumferentially spaced relationship;
an aperture in said separate body component, said second formations extending radially inwardly in said aperture from said separate body component;
interengaging shoulder means on said components for limiting relative axial displacement of said components in said one direction; and
interengaging shoulder means on said radially extending formations for limiting relative axial displacement of said components in said reverse direction.

4. A pressure cylinder as claimed in claim 1 wherein:
said cylinder component comprises two co-axially arranged cylinder portions;
said plurality of first formations comprises a plurality of first castellations on each of said cylinder portions, said first castellations on one of said portions being axially aligned with said first castellations on the other of said portions;
said plurality of second formations comprises a plurality of axially aligned pairs of castellations on said body component, each pair having facing surfaces spaced axially a distance substantially equal to the combined length of a pair of said aligned first castellations.

5. The pressure cylinder as claimed in claim 1 wherein:
said means integral with said tongue is resilient.

6. A pressure cylinder as claimed in claim 5 wherein:
said locking means prevents relative rotation between said components.

7. The pressure cylinder as claimed in claim 1 wherein:
said further formation comprises a ring groove in one of said components; and
said means integral with said tongue comprises a split ring engageable in said ring groove.

8. The pressure cylinder as claimed in claim 7 wherein:
said ring groove is in said cylinder component; and
said cylinder component has a tapering end portion at one end thereof tapering to a smaller size in the direction of said one end, said tapering end portion having a size relative to said split ring so that said split ring is expanded by passing along said tapered portion prior to interfitting in said groove by contraction during assembly of said locking means onto said cylinder component.

9. The pressure cylinder as claimed in claim 8 and further comprising:
   a reduced diameter portion on said cylinder component, said first formations extending radially outwardly from said reduced diameter portion in circumferentially spaced relationship;
   an aperture in said separate body component, said second formations extending radially inwardly in said aperture from said separate body component;
   interengaging shoulder means on said components for limiting relative axial displacement of said components in said one direction; and
   interengaging shoulder means on said radially extending formations for limiting relative axial displacement of said components in said reverse direction.

10. The pressure cylinder as claimed in claim 7 wherein: said split ring is resilient.

11. The pressure cylinder as claimed in claim 9 wherein: said split ring is resilient.

12. A pressure cylinder as claimed in claim 10 wherein:
   said locking means prevents relative rotation between said components.

13. A pressure cylinder as claimed in claim 11 wherein:
   said locking means prevents relative rotation between said components.

* * * * *